April 24, 1928.
A. W. KOON
1,667,666
PROCESS AND APPARATUS FOR DRYING HAY, GRAIN, AND THE LIKE
Filed March 30, 1926
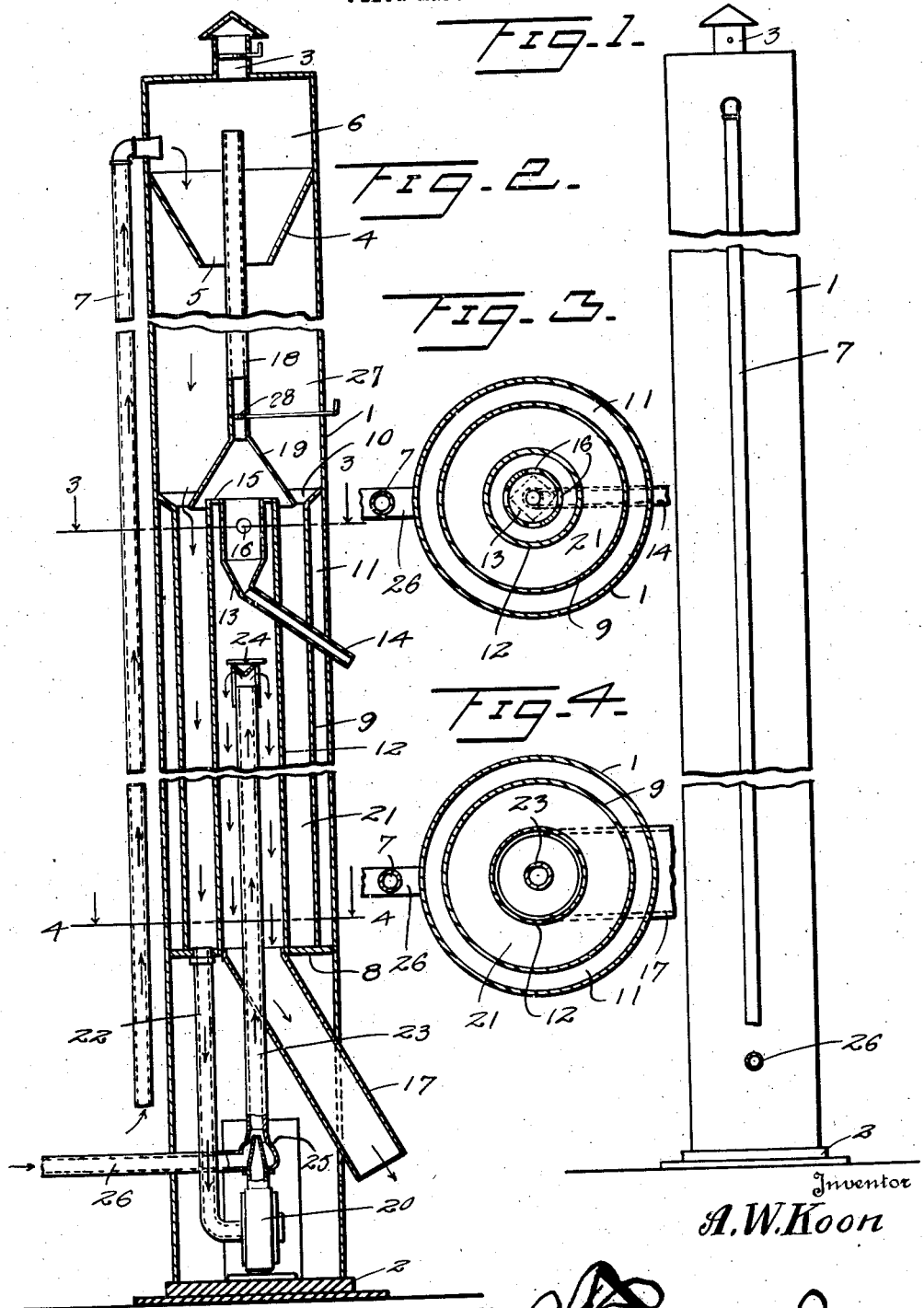
Inventor
A. W. Koon Patented Apr. 24, 1928.

1,667,666

UNITED STATES PATENT OFFICE.

ARTHUR W. KOON, OF SCHRIEVER, LOUISIANA.

PROCESS AND APPARATUS FOR DRYING HAY, GRAIN, AND THE LIKE.

Application filed March 30, 1926. Serial No. 98,538.

This invention relates to a novel process and apparatus for drying food and feed stuffs, hay, grain and the like.

The invention is hereinafter fully described and claimed and the apparatus is illustrated in the accompanying drawing, wherein:

Figure 1 is a view in side elevation of a drying apparatus embodying my invention;

Figure 2 is a sectional view taken on a plane extending centrally and vertically through the drying apparatus;

Figure 3 is a transverse sectional view taken on the plane indicated by the line 3—3 of Figure 2; and Figure 4 is a similar view taken on the plane indicated by the line 4—4 of Figure 2.

Corresponding and like parts are referred to in the following description, and designated in the several views of the accompanying drawing, by similar reference numerals.

The drying appartus comprises a tower 1 which is supported upon a suitable foundation 2 and which is provided at its upper end with a damper-controlled outlet opening 3. An inverted conical partition 4 having an opening 5 and secured within the upper end of the tower 1 provides a cyclone chamber 6 in which the material to be dried and the air therein are separated, the air passing out of the tower through the opening 3 and the material passing into the tower through the opening 5. A vertical pipe 7 having its upper end discharging into the chamber 6, and a blower, not shown, discharging into the lower end of the pipe 7, provide means by which the material to be dried is fed tangentially into the chamber 6. A horizontal partition 8 is secured within the tower 1 adjacent the lower end thereof. An inner cylinder 9 resting at its lower end upon the partition 8 and provided at its upper end with a flaring flange 10, provides a dead air space 11. A second inner cylinder 12 is located within and spaced from the cylinder 9, and is provided at its upper end with a dust separator 13 from the lower end of which extends a discharge spout 14. The dust separator 13 is suspended from the upper end of the cylinder 12 by a flange 15, and is provided in its lateral wall with openings 16. The discharge spout 14 extends downwardly and passes through the lateral wall of the tower 1. A discharge spout 17 for the dried material extends downwardly from the lower end of the cylinder 12 and passes through the lateral wall of the tower 1. The vertical pipe 18 in axial alinement with the cylinder 12, has its upper end positioned in the chamber 6 and is provided at its lower end with a conical deflector 19 which overlies the upper end of the dust separator 13. A damper 28 is located in the pipe 18 immediately above the deflector 19. A blower 20 is mounted on the base 2 within the tower 1 and the intake port thereof is in communication with the lower end of the chamber 21 provided by and located between the cylinders 9 and 12, and the discharge port thereof is in communication with the interior of the cylinder 12. The communication between the blower 20 and the chamber 21 is established by a pipe 22, and the communication between the blower and the interior of the cylinder 12 is established by a pipe 23. The upper or discharge end of the pipe 23 is located adjacent the dust separator 13, and secured to said end of this pipe is a conical spreader 24. The pipe 23 is provided with an injector 25, and communicating with the injector is a pipe 26 extending from the combustion chamber or smoke stack of a furnace, not shown. The lower end of the chamber 6 and the upper end of the chamber 21 are in communication with an intermediate chamber 27.

In practice, the material to be dried, is forced by a blower through the pipe 7 into the chamber 6. The air from the pipe 7 passes out through the opening 3 and the material flows from the chamber 6 into the chamber 27 and thence into the chamber 21. The material is drawn from the chamber 21 down through the pipe 22 and forced up through the pipe 23 into the cylinder 12 by the blower 20. As the material leaves the upper or discharge end of the pipe 23 it is spread in all directions by the element 24 and flows down the cylinder 12 to and through the discharge spout 17. The passage of the exhaust from the blower 20 through the injector 25 creates a strong suction in the pipe 26 with the result that the high temperature furnace gases are drawn through the pipe 26, and forced out through the pipe 23. When the valve 28 is closed the gases will after leaving the upper or discharge end of the pipe 23 pass through the upper portion of the cylinder 12, the dust separator 13, the chamber 27, the chambers 6 and thence out through the opening 3. It will thus be seen that the material will as it flows down through the chambers 6 and 27 pass through the gases flowing upwardly through these chambers, and that as a result a large percentage of its moisture will be removed in these chambers and pass with the gases out through the opening 3. The material will be further heated during its passage through the chamber 21 by the heat radiated from the cylinder 12, and will be finally heated during its passage through the pipe 23 and the cylinder 12. The material will be subjected to the highest drying temperature during its passage through the pipe 23 due to the fact that this pipe is comparatively small and to the fact that the material and gases are simultaneously passing through this pipe. The passage of the gases and vapor through the opening 5 and the suction maintained at the upper end of the chamber 21 by the blower 20, creates and maintains a condition in the chamber 27 which permits the material to freely flow downwardly through this chamber and the gases and vapors extracted from the material to freely flow upwardly through the chamber.

When the valve 28 is opened, the gases will not flow through the chamber 27 but will instead flow up through the deflector 19, the pipe 18, the upper portion of chamber 6 and thence out through the opening 3. This results in the lowering of the temperature to which the material is subjected during its passage through the chamber 27, and this valve is closed whenever the material contains a comparatively small amount of moisture. The heat to which the material will be subjected during its passage through the chamber 27 when the valve 28 is closed, radiates from the deflector 19 and pipe 18.

The dust in the material will be caught by the separator 13 and discharged from the apparatus through the spout 14. The manner in which the material is fed to and passes through the apparatus is clearly illustrated by arrows in Figure 2. If the material to be dried is hay or the like, it is comminuted before being fed to the apparatus.

From the foregoing description, taken in connection with the accompanying drawing, it will be apparent that the material is subjected to a gradually increasing temperature as it passes through the tower 1 to the blower 20, that it is subjected to very high temperature as it passes through the pipe 23, and that it is maintained at this temperature as it passes from the pipe 23 to the discharge spout 17. It will be further apparent the exhaust gases, that is the gases passing upwardly through the chamber 27, preheat the incoming material, that is, the material passing downwardly through the chamber 27, at a temperature that prevents resaturation.

What is claimed is:—

1. A drying apparatus having inner and outer chambers, a blower, a pipe communicating with one of the chambers and with the discharge port of the blower, a second pipe communicating with the other chamber and with the intake port of the blower, means for feeding material to said last named chamber, and a pipe for conducting a heating medium into said first pipe.

2. A drying apparatus having inner and outer chambers, a blower, a pipe communicating with one of the chambers and blower, a second pipe communicating with the other chamber and blower, means for feeding material to one of said chambers, an injector in one of said pipes, and a pipe for conducting a heating medium to the injector.

3. A drying apparatus comprising inner and outer chambers, a blower, a pipe communicating with one of the chambers and with the intake port of the blower, a second pipe extending from the discharge port of the blower into the other chamber, a discharge spout for said other chamber, an injector in said last named pipe, and a pipe for conducting a heating medium to the injector.

4. A drying apparatus comprising a tower provided in its upper end with a cyclone chamber and in its lower portion with inner and outer chambers, a feed pipe communicating with the cyclone chamber, a blower, a pipe communicating with said outer chamber and with the intake port of the blower, a pipe extending from the discharge port of the blower into said inner chamber and provided with an ejector, and a pipe for conducting a heating medium to the pipe injector.

5. A drying apparatus comprising a tower provided in its upper end with a cyclone chamber and in its lower portion with inner and outer chambers, a feed pipe discharging into the cyclone chamber, a dust separator carried by said inner chamber, a pipe extending from said inner and outer chambers into the cyclone chamber and provided with a deflector and a damper and positioned above the dust separator, a blower, a pipe communicating with the lower end of the outer chamber and with the intake port of the blower, a pipe provided with an injector and extending from the discharge port of the blower into the inner chamber, a discharge spout for the dust separator, a pipe for conducting a heating medium to the injector, and a discharge spout for the inner chamber.

6. A drying apparatus comprising a tower provided in its upper end with a chamber and in its lower portion with inner and outer chambers, means for delivering the material to be dried to the upper chamber, a blower, a pipe communicating with the outer chamber and with the intake port of the blower, a pipe communicating with the inner chamber and with the discharge port of the blower, a heating medium supply pipe communicating with said last named pipe, and a pipe communicating with the inner and outer chambers and with the upper chamber.

7. A drying apparatus comprising a tower provided with an upper chamber, lower inner and outer chambers and an intermediate chamber, means for withdrawing the material being dried from the outer chamber and introducing it and a heated gas into the inner chamber, and a pipe arranged within the intermediate chamber and communicating with the upper chamber and with the inner and outer chambers.

8. A drying apparatus comprising a tower provided with an upper chamber, lower inner and outer chambers and an intermediate chamber, means for withdrawing the material being dried from the outer chamber and introducing it and a heated gas into the inner chamber, a pipe arranged within the intermediate chamber and communicating with the upper chamber and with the inner and outer chambers, and a valve in said pipe.

9. The herein described process for drying hay, grain and the like, consisting in the formation of currents of heated gas and the material to be dried, in causing the currents to travel one within the other and in opposite directions and out of intimate contact during one phase of their motion, in introducing the current of material into the current of gas and causing the currents to travel in commingled relation and in the same direction during another phase of their motion, in separating the material from the current of gas, and in thereafter causing the currents to travel one within the other and in opposite directions and out of intimate contact.

10. The herein described process for drying hay, grain and the like, consisting in the formation of currents of heated gas and the material to be dried, in causing the currents to travel one within the other and in intimate contact and in opposite directions during one phase of their motion, in causing the currents to travel one within the other and out of intimate contact and in opposite directions during another phase of their motion, in introducing the current of material into the current of gas and causing the currents to travel in commingled relation and in the same direction during another phase of their motion, in separating the material from the current of gas, and in thereafter causing the currents to travel one within the other and out of intimate contact and in opposite directions.

11. The herein described process for drying hay, grain and the like, consisting in the formation of currents of heated gas and the material to be dried, in causing the currents to travel one within the other and in opposite directions and out of intimate contact during one phase of their motion, in introducing the current of material into the current of gas and causing the currents to travel in commingled relation and in the same direction during another phase of their motion, in separating the material from the current of gas, in causing the currents to travel one within the other and in opposite directions and out of intimate contact, and in thereafter separating the dust from the current of gas.

12. The herein described process for drying hay, grain and the like, consisting in the formation of currents of heated gas and the material to be dried, in causing the currents to travel one within the other and in intimate contact and in opposite directions during one phase of their motion, in causing the currents to travel one within the other and out of intimate contact and in opposite directions during another phase of their motion, in introducing the current of material into the current of gas and causing the currents to travel in commingled relation and in the same direction during another phase of their motion, in separating the material from the current of gas, in causing the currents to travel one within the other and out of intimate contact and in opposite directions, and in thereafter separating the dust from the current of gas.

In testimony whereof I affix my signature.

ARTHUR W. KOON.